Patented Dec. 13, 1932

1,890,996

UNITED STATES PATENT OFFICE

HANS KURZ AND KARL ALBERT, OF VIENNA, AUSTRIA

INK FOR INTAGLIO PRINTING AND IMPROVEMENT IN THE PRODUCTION OF SUCH INKS

No Drawing. Application filed February 19, 1931, Serial No. 517,107, and in Austria February 25, 1930.

This invention relates to a process for producing inks for intaglio printing, more particularly for ("Rakel") ductor intaglio printing.

Up to now in "Rakel" intaglio printing the so-called oil intaglio printing inks have been chiefly used as well as, to a continuously diminishing extent, the so-called water intaglio printing inks. The oil intaglio printing inks certainly yield in every respect satisfactory print, however, owing to their having exylene as a basis for their composition they have the serious disadvantage of being inflammable and poisonous. Various attempts have already been made to diminish the inflammability but without real success. The poisonous properties of the inks always remain however. For example, chlorinated hydro-carbons have been used in place of benzene hydro-carbons, and non-inflammable inks are certainly obtained thereby but they impair the health to a higher extent than the intaglio inks used up to now. Since a rapid speed of evaporation of the solvent used is essential for carrying out the intaglio process, for the print must dry quickly, an ink which is neither inflammable, nor poisonous, is not possible with the aid of organic solvents, according to the present day state of the art.

The two said drawbacks are both removed by water inks, but these inks have the disadvantage, which also excludes their general application, that the print produced with them is water soluble. Attempts have also been made to obtain waterproof print with the aid of water inks, but hitherto this was effected only by the exclusive use of soluble colouring matter, a fact which excluded practically useful print being produced, since only the presence of insoluble pigments, such as are exclusively contained in the non-waterproof water intaglio printing inks, enables the production of inks which yield practically useful prints.

The said disadvantages of the said two types of ink are removed by the present invention and the advantages thereof are united and even enhanced. According to the present invention, a pigment, or a mixture of several pigments, is rubbed up with a binding agent which consists essentially of a solution of resins, such as acaroid (xanthorrhoea resin) dammar, pine resin, colophony, Venetian turpentine, shellac and the like, or spirit-soluble artificial resins, in spirit or other water soluble solvents, which resins are wholly or partially saponified by ammonia, alkalies, or alkaline reacting salts. An addition of turpentine oil, or of other high boiling solvents, which are miscible with spirit and the like, such as cyclohexanol, methyl cyclohexanol, tetra- or decahydronaphthalene, aniline, and the like, deprives the resins of their brittleness on drying. A small addition of water soluble soaps may be made if necessary, which prevents the thickening of the binding agent which occurs when the same contains only ammonium salt of resin acid. If the binding medium contains potassium salt of resin acid, no thickening of the printing ink occurs. The pigments are rubbed up with such a binding agent and thereupon, simultaneously or subsequently, are brought to the necessary consistency and yield by means of water. The addition of water is essential for several reasons. Without it the ink, or the binding medium, would strike through the paper during the printing. Only by the addition of water is the dissolved colophony brought into a sufficiently coarsely dispersed colloidal form, so that no striking through occurs. The quantity of water necessary for attaining this aim is in each case so large that the spirit contained in the binding agent is brought below the limiting concentration at which it remains inflammable. By dissolving water soluble colouring matter in the water used for the dilution, the colours may be toned down as desired.

The intaglio printing inks provided according to this invention occupy an intermediate position between the oil intaglio printing inks and the water intaglio printing inks used to-day, inasmuch as they contain both water and organic solvents. They differ completely, however, both in effect and also chemically, from each of these two types of inks. In the cases here described, the resin represents preeminently the actual binding medium for the waterproof binding of the pigment particles. Resins are not contained at all in water intaglio printing inks and in so far as resins, more particularly colophony, are added to the oil intaglio printing inks, their presence is not essential for binding the pigments, but they mainly serve for producing the desired thick liquidity as well as for obtaining lustrous prints. Owing to their different physical behaviour, the new printing inks permit of an improved impression and consequently enable rougher and less heavy paper to be used.

In the following examples when parts are mentioned it is to be understood that these always refer to parts by weight.

*Examples*

1. 10 parts of colophony are dissolved with 5 parts of 96% spirit and two parts of turpentine oil with simultaneous or subsequent addition of 3 parts of concentrated aqueous ammonia and 2.5 parts of soft-potash soap while stirring in the cold or in moderate heat. The pigment is rubbed up with this binding medium. The following dyes made by the I. G. Farbenindustrie Actiengesellschaft may, for example, serve as pigment: baryta lakes of acid dyestuffs, such as orange II or anthosine violet or acid green or even artificial pigment dyes, such as hansa yellow, permanent red, heliomarine blue and so forth. Approximately the same quantity of water is added to the rubbed pigment as is present as binding medium. However, the addition of water to the ink is advantageously effected before the rubbing operation.

2. 10 parts of colophony, 7 parts of pine resin or Venetian turpentine, 8 parts of isopropyl alcohol, and 4 parts of caustic potash dissolved in 20 parts of water or the equivalent quantity of ammonia, are mixed at ordinary or slightly raised temperature and the solution obtained is used for rubbing the colours. The addition of a high-boiling solvent is here dispensed with owing to the content of turpentine oil in the Venetian turpentine. The water necessary for the finished ink is already present in the free or dissolved form owing to the introduction of caustic potash.

3. Just as in Example 2, except that 7 parts of pine resin or Venetian turpentine, 5 parts of acaroid or the same quantity of dammar, shellac, or a soluble artificial resin and furthermore, 2 parts of turpentine oil or cyclohexanol or deca- or tetra-hydronaphthalene, are taken.

4. Just as in Example 1, except that, instead of 5 parts of 96% spirit, 3 parts of spirit and 2 parts of acetone are taken.

5. 10 parts of colophony are saponified in a hot solution of 2 parts of potassium carbonate in 20 parts of water and after cooling are mixed, while stirring, with 5 parts of spirit and 2 parts of turpentine oil. The further stages are carried out as in Example 2.

6. One starts with 10 parts of shellac and works as described in Example 5, except that 3 parts of borax are used in place of 2 parts of potassium carbonate.

7. 10 parts of colophony or one of the resins mentioned in the other examples, are dissolved in 5 parts of spirit and 2 parts of turpentine oil and 3 parts of tri-potassium phosphate, dissolved in the necessary quantity of water, are added. This salt, although less advantageously, may be replaced by potassium bicarbonate or potassium waterglass.

8. When working in accordance with any of the foregoing examples, a soluble colouring substance is dissolved in the water to be used for dilution for the purpose of changing the tint of the ink produced. More particularly a soluble dyestuff is used chosen from the group of acid dyestuffs, such as, for example, orange II, anthosine, acid green and the like, all made by the I. G. Farbenindustrie Aktiengesellschaft.

What we claim is:—

1. A process for producing intaglio printing inks consisting in rubbing the pigments with a binding medium containing as its main constituent a resinous substance dissolved in a water soluble medium, then partially saponifying the resin by addition of an alkaline reacting substance and then introducing in the mixture a high boiling solvent miscible with the said water soluble medium and adding a sufficient quantity of water.

2. A process as described in claim 1 in which the resinous substance is selected from a group consisting of acroid, pine resin and colophony.

3. A process as described in claim 1 in which the water soluble media is selected from a group consisting of ethyl alcohol of 96% strength, insopropyl alcohol and acetone.

4. A process as described in claim 1 in which the alkaline reacting substance is selected from a group consisting of alkali, ammonia, and alkaline reacting salt.

5. A process as described in claim 1 in which the specific high boiling solvent miscible with water soluble medium is turpentine oil of 160° C. to 220° C. boiling point.

6. A process as described in claim 1 in which the resinous substance is selected from a group consisting of acroid, pine resin and colophony; the water soluble media is selected from a group consisting of ethyl alcohol of 96% strength, isopropyl alcohol and acetone; the alkaline reacting substance is selected from a group consisting of alkali, ammonia, and alkaline reacting salt; and the specific high boiling solvent miscible with the water soluble medium is turpentine oil of 160° C. to 220° C. boiling point.

In testimony whereof we affix our signatures.

HANS KURZ.
KARL ALBERT.